(12) United States Patent
Rubio Vidales et al.

(10) Patent No.: US 9,749,881 B2
(45) Date of Patent: Aug. 29, 2017

(54) TECHNIQUE FOR PACKET FLOW ANALYSIS

(75) Inventors: Jose Rubio Vidales, Torrelodones (ES); Rodrigo Alvarez Dominguez, Madrid (ES); Luis Campo Giralte, Madrid (ES); Alfonso de Jesus Perez Martinez, Madrid (ES)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 251 days.

(21) Appl. No.: 13/810,988

(22) PCT Filed: Jul. 21, 2010

(86) PCT No.: PCT/EP2010/004475
§ 371 (c)(1),
(2), (4) Date: Jan. 18, 2013

(87) PCT Pub. No.: WO2012/010183
PCT Pub. Date: Jan. 26, 2012

(65) Prior Publication Data
US 2013/0114460 A1 May 9, 2013

(51) Int. Cl.
*H04W 24/04* (2009.01)
*H04L 12/14* (2006.01)
(Continued)

(52) U.S. Cl.
CPC ......... *H04W 24/04* (2013.01); *H04L 12/1407* (2013.01); *H04L 41/0893* (2013.01);
(Continued)

(58) Field of Classification Search
None
See application file for complete search history.

(56) References Cited

U.S. PATENT DOCUMENTS 7,844,728 B2 * 11/2010 Anderson et al. ............ 709/233
8,041,806 B2 * 10/2011 Gassewitz et al. ........... 709/224
(Continued)

FOREIGN PATENT DOCUMENTS

EP 1973266 A1 9/2008
EP 2045974 A1 4/2009
(Continued)

OTHER PUBLICATIONS

European Telecommunications Standards Institute (ETSI), "Digital Cellular Telecommunications System (Phase 2+); Universal Mobile Communications System (UMTS); LTE; Policy and Charging Control Architecture (3GPP TS 23.203 version 8.6.0 Release 8)", Technical Specification, ETSI TS 123 203, Jun. 1, 2009, pp. 1-60, V8.6.0, ETSI, Sophia Antipolis Cedex, France.
(Continued)

*Primary Examiner* — Tejis Daya
(74) *Attorney, Agent, or Firm* — Patents on Demand, P.A.; Brian K. Buchheit; Scott M. Garrett

(57) ABSTRACT

A technique for generating or updating a user profile based on a packet flow in a communications network from a user terminal to a destination address is described. A method implementation of this technique comprises receiving, by a Policy Control and Charging Rules Function (PCRF) from a Policy and Charging Enforcement Function (PCEF), at least one item of information indicative of at least one of the destination address and a service provided at the destination address to the user terminal. Based on this item of information, a user profile for a user associated with the user terminal is generated or updated.

10 Claims, 9 Drawing Sheets

(51) Int. Cl.
 *H04L 12/24* (2006.01)
 *H04M 15/00* (2006.01)
 *H04W 12/12* (2009.01)
 *H04L 29/08* (2006.01)
 *H04W 12/08* (2009.01)

(52) U.S. Cl.
 CPC ............ *H04L 67/22* (2013.01); *H04L 67/306* (2013.01); *H04M 15/66* (2013.01); *H04W 12/12* (2013.01); *H04L 41/509* (2013.01); *H04L 41/5087* (2013.01); *H04L 41/5096* (2013.01); *H04W 12/08* (2013.01)

(56) References Cited

U.S. PATENT DOCUMENTS

| | | | | |
|---|---|---|---|---|
| 8,406,137 | B2* | 3/2013 | Siddam et al. | 370/235 |
| 8,433,794 | B2* | 4/2013 | Baniel et al. | 709/224 |
| 8,509,091 | B2* | 8/2013 | Tan et al. | 370/241 |
| 8,644,337 | B2* | 2/2014 | Siddam et al. | 370/468 |
| 8,694,619 | B2* | 4/2014 | Mariblanca Nieves | 709/223 |
| 8,792,495 | B1* | 7/2014 | Dixon | H04L 47/624 370/394 |
| 2002/0143939 | A1 | 10/2002 | Riddle et al. | |
| 2008/0232376 | A1* | 9/2008 | Huang et al. | 370/395.3 |
| 2009/0030981 | A1* | 1/2009 | Knoepp et al. | 709/204 |
| 2009/0037999 | A1* | 2/2009 | Anderson | H04W 28/16 726/12 |
| 2009/0138427 | A1* | 5/2009 | Kalavade | 707/1 |
| 2010/0217877 | A1* | 8/2010 | Willars et al. | 709/228 |
| 2011/0022702 | A1* | 1/2011 | Riley et al. | 709/224 |
| 2011/0041182 | A1* | 2/2011 | Stenfelt | 726/23 |
| 2011/0289202 | A1* | 11/2011 | Riley | 709/223 |
| 2011/0307790 | A1* | 12/2011 | Pandya | H04L 12/1403 715/735 |
| 2011/0320622 | A1* | 12/2011 | Cutler | H04L 12/14 709/230 |
| 2012/0101952 | A1* | 4/2012 | Raleigh et al. | 705/304 |
| 2013/0305322 | A1* | 11/2013 | Raleigh et al. | 726/4 |

FOREIGN PATENT DOCUMENTS

| | | |
|---|---|---|
| WO | 2009017738 A2 | 2/2009 |
| WO | 2009132700 A1 | 11/2009 |

OTHER PUBLICATIONS

Balbas, J.-J. P. et al., "Policy and Charging Control in the Evolved Packet System", IEEE Communications Magazine, LTE-3GPP Release 8, Feb. 1, 2009, pp. 68-74, vol. 47, Issue 2, IEEE, USA.
European Telecommunications Standards Institute (ETSI), "Universal Mobile Telecommunications System (UMTS); LTE; Policy and charging control over Gx reference point (3GPP TS 29.212 version 8.3.0 Release 8)", Technical Specification, ETSI TS 129 212, Apr. 1, 2009, pp. 1-83, V8.3.0, ETSI, Sophia Antipolis Cedex, France.

* cited by examiner

TECHNIQUE FOR PACKET FLOW ANALYSIS

TECHNICAL FIELD

The present disclosure generally relates to the analysis of packet flows in a communications network. Specifically, a packet analysis technique that relies on Deep Packet Inspection (DPI) is disclosed.

BACKGROUND

While communications networks have in the past mainly been used for circuit-switched services (i.e., telephony), modern communications networks are increasingly being utilized for providing multimedia and other complex services to users. Such services typically require packet-switched transmission technologies based on, for example, the Internet Protocol (IP). In this context, the $3^{rd}$ Generation Partnership Project (3GPP) has defined the so-called IP Multimedia Subsystem (IMS) for a standardized access from different access networks to a plethora of different IP-based services.

As more and more users are making use of packet-based services, there is also a need to understand the underlying packet flows. Such an understanding is important for network optimization in general, and in particular for improving network experience from the perspective of an individual user. DPI-based network mechanisms are commonly used to monitor and control packet-based network traffic. Such mechanisms inspect, analyse (e.g., classify) and take action based on packet contents (also called payload) rather than just based on packet headers.

Conventionally, DPI is employed to identify the services that generate and receive data packets. As a result, the packet transfer can be delayed or speeded-up depending on the needs of a particular service or of a particular communication service provider. As an example, DPI forms the basis for delaying, or "throttling", data packets from certain Peer-to-Peer (P2P) services such as BitTorrent by Internet Service Providers (ISPs). DPI can also be set up in a passive manner to gather information how the communications network is used at an aggregate level. This information can be used to understand the nature of possible network bottlenecks and to identify the responsible services.

SUMMARY

There is a need to efficiently and beneficially implement DPI-based mechanisms in a 3GPP compliant network.

According to a first aspect, a method of generating or updating a user profile based to on a packet flow in a communications network from a user terminal to a destination address is provided. The method comprises receiving, by a Policy Control and Charging Rules Function (PCRF), from a Policy and Charging Enforcement Function (PCEF) at least one item of information indicative of at least one of the destination address and a service provided at the destination address to the user terminal; and generating or updating, based on the item of information, a user profile for a user associated with the user terminal. It should be noted that the generating or updating step may be performed by the PCRF itself or by any other network component directly or indirectly communicating with the PCEF.

The PCEF may thus implement a DPI engine for analyzing packet flows (e.g., on a per session and/or per user basis) and for reporting the analysis results to the PCRF for user profile generation or updating. Additionally, the PCEF may apply (e.g., dynamically and in real-time) actions responsive to instructions received from the PCRF for an on-going user session. These instructions may be generated by the PCRF based on information received from the PCEF and/or derived from the associated user profile. In one implementation, the instructions generated by the PCRF are generated by combining user traffic related information (from the PCEF) with user information included, for example, in a Subscription Profile Repository (SPR).

The destination address may comprise at least one of an IP address, a Universal Resource Identifier (URI) such as a Universal Resource Locator (URL) and a domain name. The service may comprise at least of a Domain Name Resolution (DNR) service, a web service, a Voice over IP (VoIP) service, an IMS service and a P2P service.

The step of generating or updating the user profile may comprise associating at least one user class with the user profile based on the item of information received from the PCEF. In this context, two or more predefined user classes may exist, and one or more of the predefined user classes may be allocated to a specific user profile based on the particular item of information received from the PCEF.

In one variant, the method may further comprise receiving, by the PCRF from the PCEF, a notification regarding the opening of a user session involving the user terminal. In such a situation, the PCEF may specifically be instructed by the PCRF to collect and transmit the item of information for the particular user session. Additionally, or in the alternative, the PCRF may also inform the PCF about the specific content of the item of information to be collected and transmitted to the PCRF. This specific content may include one or more of an IP address visited by the user terminal, a URI (e.g., a URL) visited by the user terminal, one or more of the domains visited most often, one or more of the web pages visited most often, the time spent visiting a web page, an ordered list of IP addresses, an ordered list of URIs, the particular domains to report or to avoid reporting, the visiting of a VoIP server, and so on.

The method may further comprise transmitting by the PCRF the user profile or information derived therefrom or included therein to the PCEF. In this context, the PCRF may transmit at least one of a user class indication, a preferred service indication, a preferred destination address indication, a Quality of Service (QoS) indication and a charging indication. For example, the PCRF may receive, from the PCEF, a notification regarding establishment of at least one of new user session, a new packet flow and a new destination address for the user terminal. In response to this notification, the user profile or the information derived therefrom or included therein may be transmitted to the PCEF, and the PCEF may change data flow handling based thereon.

According to a further aspect, a method of reporting in a communications network a packet flow from a user terminal to a destination address is provided, wherein the method comprises analyzing, by a PCEF, the packet flow to determine an item of information indicative of at least one of the destination address and the service provided at the destination address; and transmitting, to a PCRF, the item of information. The item of information may enable generation or updating, based on the item of information, of a user profile for a user associated with the user terminal. The item of information may be transmitted by the PCEF itself or by any other network component directly or indirectly communicating with the PCEF.

The item of information may be sent by the PCEF in response to a trigger event. The trigger event may comprise, among others, at least one of expiration of a user session, a lapse of a predefined period of time, reach of a predefined data volume, selection of a new destination address, and a specific request from the PCRF.

The PCEF may receive user profile-related information from the PCRF. In such a situation, the PCEF may handle the current packet flow (e.g., for the current session) or another subsequent packet flow (e.g., for a subsequent session) of the user terminal based on the user profile information. As an example, the user profile information may comprise a user class indication. In this case, packet flow handling may comprise inserting, by the PCEF, the user class indication into one or more data packets.

The user profile information may also comprise at least one of a preferred service indication and a preferred destination address indication. In such a case packet flow handling may comprise a packet flow analysis by the PCEF taking into account at least one of the preferred service indication and the preferred service destination address indication. As an example, packet flow analysis may be configured to start with at least one of the preferred service indication and the preferred destination address indication signalled by the PCRF.

Still further, the user profile information may comprise a QoS indication, and packet flow handling may comprise enforcing, by the PCEF, the QoS indication. Additionally, or in the alternative, the user profile information may comprise a charging indication. The charging information may be transmitted by the PCEF to a charging component such as an Online Charging System (OCS), and packet flow handling may comprise charging, by the charging component, in accordance with the charging indication.

The technique presented herein may be implemented in the form of software, in the form of hardware or as a software/hardware combination. As for a software aspect, a computer program product comprising program code portions for performing the steps presented herein when the computer program product is run on one or more computing devices is provided. The computer program product may be stored on a computer-readable recording medium such as a memory chip, a CD-ROM or DVD, a hard disk and so on. Moreover, the computer program product may be provided for a download (e.g., via the Internet) onto such a recording medium.

According to a further aspect, a device for generating or updating a user profile based on a packet flow in a communication network from a user terminal to a destination address is provided, wherein the device comprises a PCRF adapted to receive, from a PCEF, at least one item of information indicative of at least one of the destination address and a service provided at the destination address to the user terminal; and a processor for generating or updating, based on the item of information, a user profile for a user associated with the user terminal.

Also provided is a PCEF for reporting in a communications network a packet flow from a user terminal to a destination address, wherein the PCEF comprises an analyzer adapted to analyze the packet flow to determine an item of information indicative of at least one of the destination address and a service provided at the destination address; and an interface adapted to transmit to a PCRF the item of information. The item of information may enable generation or updating, based on the item of information, of a user profile for a user associated with the user terminal.

The PCEF and the device including the PCRF may belong to a Policy and Charging (PC) system. The PC system may further comprise at least one of an SPR and an OCS and may be coupled to or belong to an IMS or any other service provisioning network.

BRIEF DESCRIPTION OF THE DRAWINGS

Further aspects and advantages of the technique presented herein will become apparent from the following description of exemplary embodiments in conjunction with the drawings, wherein.

DETAILED DESCRIPTION

In the following description of preferred embodiments, for purposes of explanation and not limitation, specific details are set forth (such as particular signalling steps and service types) in order to provide a thorough understanding of the technique presented herein. It will be apparent to one skilled in the art that this technique may also be practised in other embodiments that depart from these specific details.

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in the context of methods, functionalities and devices, the technique presented herein may also be embodied in a computer program product as well as in a system comprising a computer processor and a memory coupled to the processor, wherein the memory is encoded with the computer program product to perform the services, functionalities and steps disclosed herein.

Figure 1:
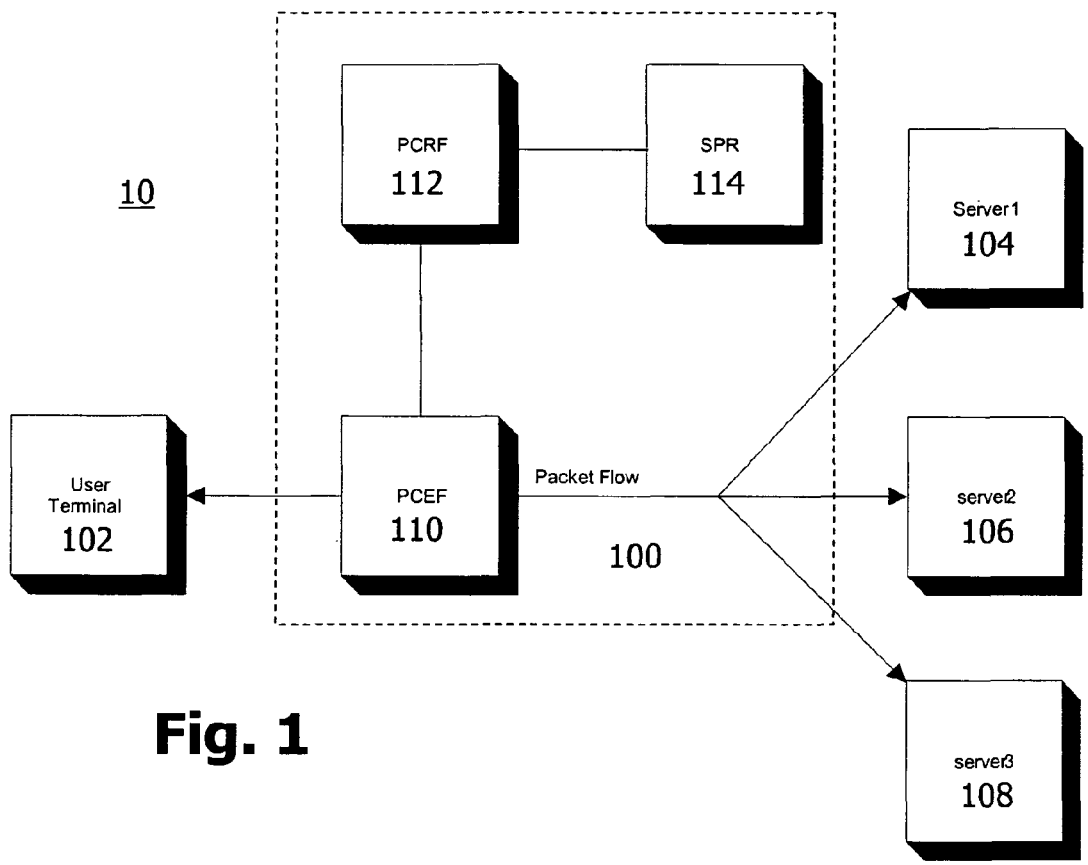
FIG. 1 illustrates an embodiment of a Policy and Charging system comprising a PCEF and a PCRF.

FIG. 1 illustrates a 3GPP compliant communications network 10 which comprises an embodiment of a Policy and Charging (PC) system 100 coupled between a user terminal 102 on the one hand and multiple servers 104, 106, 108 on the other. The user terminal 102 may be a mobile or stationary terminal such as a mobile telephone, a data or network card or a notebook computer. The servers 104, 106, 108 may be Application Servers (ASs) of an IMS, Internet servers, or any other servers capable of serving the user terminal 102.

The PC system 100 comprises a PCEF 110 intercepting the packet flow between the user terminal 102 and the servers 104, 106, 108, a PCRF 112 coupled to the PCEF 110 as well as an SPR 114 coupled to the PCRF 112. The PCEF 110, PCRF 112 and SPR 114 are compliant with the applicable 3GPP specifications including 3GPP TS 23.203 (see, e.g., section 6.2) and 3GPP TS 29.212 (see, e.g., section 4.4). Generally, the PCEF 110 is the functional element that encompasses service packet flow detection, policy enforcement and flow based charging functionalities. The PCRF 112, on the other hand, is the functional element that encompasses policy control decision and flow based charging control functionalities. The SPR 114 provides subscriber-specific data to the PCRF 112, to assist in evaluating policy decisions. In addition to these conventional functionalities, the PCEF 110, PCRF 112 and SPR 114 of the PC system embodiment 100 illustrated in FIG. 1 provide DPI and user profile based functionalities as will be described in more detail below.

Figure 2:
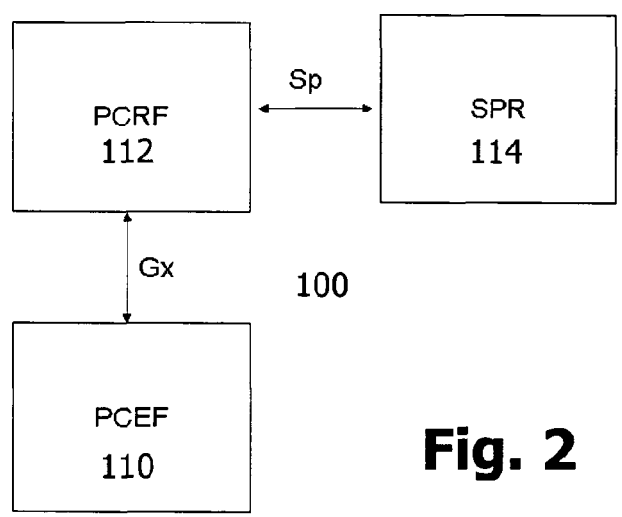
FIG. 2 illustrates communication interfaces of the PCRF and the PCEF.

As illustrated in FIG. 2, signalling within the PC system 100 occurs mainly over the Gx reference point between the PCEF 110 and the PCRF 112 as well as over the Sp reference point between the PCRF 112 and the SPR 114. The Gx reference point generally provides reporting functionalities from the PCEF 110 to the PCRF 112 as well as commanding functionalities from the PCRF 112 to the PCEF 110. The Sp reference point allows the PCRF 112 to request subscription information from the SPR 114 based on, for example, a subscriber identifier associated with the user terminal 102 (or its user), a Packet Data Network (PDN) identifier and/or session attributes. It should be noted that one or more of the functionalities described herein could also be implemented via the Gy reference point between the PCEF 110 and an OCS.

Figure 3:
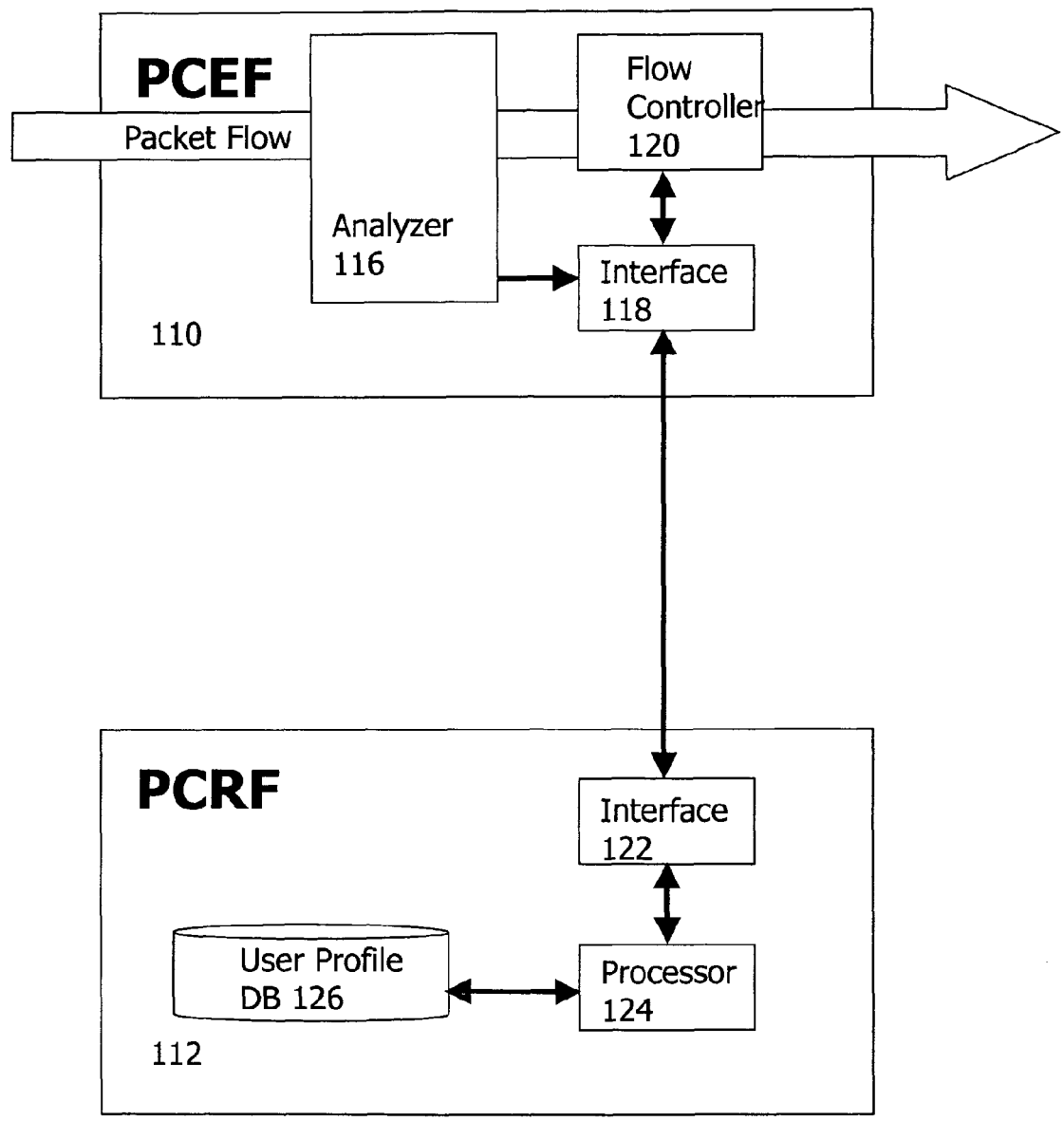
FIG. 3 shows an embodiment of the PCEF and an embodiment of the PCRF.

FIG. 3 illustrates in more detail the internal configuration of embodiments of the PCRF 112 and of the PCEF 110. As becomes apparent from FIG. 3, the PCEF 110 comprises an analyzer 116 adapted to analyze the packet flow between the user terminal 102 and any of the exemplary servers 104, 106, 108. Specifically, the analyzer 116 is adapted to analyze this packet flow to determine an item of information indicative of at least one of a destination address of a particular server 104, 106, 108 and a service provided at this destination address. The analyzer 116 is in communication with an interface 118. The interface 118 is adapted to transmit the item of information determined by the analyzer 116 to the PCRF 112. In one implementation, the interface 118 is configured as a Gx interface.

The PCEF 110 further comprises a flow controller 120 in communication with the interface 118. The flow controller 120 is adapted to perform packet flow handling based on instructions and/or user profile information received from the PCRF 112.

Turning now to the PCRF 112, this network component comprises an interface 122 (e.g., a Gx interface) adapted to receive, from the PCEF 110, the item of information determined by the analyzer 116. Further, the PCRF 112 comprises a processor 124 coupled to the interface 122 and adapted to generate or update, based on the item of information, a user profile for a user associated with the user terminal 102. To this end, the PCRF 112 comprises a user profile database 126 in which user profiles for a large number of users are stored. It should be noted that the user profile database 126 could also be located outside the PCRF 112 (e.g., on the SPR 114 or any other network component) as long as it remains accessible to the PCRF 112.

In the following, the operation of the PCRF 112 and PCEF 110 illustrated in FIG. 3 will be described in more detail with reference to exemplary method embodiments illustrated in FIGS. 4 to 10. For an easier understanding, the operation will be explained with respect to two separate operational phases. The first operational stage basically covers the operation of the PCRF 112 and PCEF 110 to generate or update a user profile for the user terminal 102 in the user profile database 126. The second operational stage relates to the implementation of policy actions by the PCEF 110 under control of the PCRF 110 based, for example, on the generated or updated user profile. While the two operational phases will be described one after the other, it will be understood that they could also be performed concurrently.

In brief, during the first operational stage, the PCEF 110 tracks user behaviour for the user terminal 102 based on DPI and reports this user behaviour to the PCRF 112 for user profile generation or updating. The reported information comprises at least one of a destination address of any of the servers 104, 106, 108 currently serving the user terminal 102 and a service provided by the respective server 104, 106, 108. As possible examples of the destination address information, an IP address or URI (e.g., URL) of any of the servers 104, 106, 108 serving the user terminal 102 may be reported to the PCRF 112. Alternatively, or in addition, an ordered list of the visited IP addresses and/or URIs may be reported. Still further, the destination address information may also comprise the most visited domains (e.g., domain names) and/or the most visited web pages. Examples for service information reported from the PCEF 110 to the PCRF 112 comprise visiting of VoIP servers, utilization of P2P services or IMS services, and so on.

During the second operational phase, the PCRF 112 takes a policy control decision based on the information received from the PCEF 110 and preferably stored or updated in the user profile database 126. The policy control decision may additionally take into account information pertaining to the user terminal 102 (or the associated user/subscriber) as obtained from the SPR 114. Accordingly, the PCRF 112 may combine user information from the SPR 114 with traffic information from the PCEF 110 (or from the user profile database 126) to arrive at a policy control decision. The policy control decision will then be communicated to the PCEF 110 during the second operational stage.

According to one exemplary policy control decision, profile enrichment is carried out with respect to the packet flow between the user terminal 102 and any of the servers 104, 106, 108 serving the user terminal 102. As an example, user profile information may be added to the packets sent towards the servers 104, 106, 108 or towards the user terminal 102. Another exemplary policy control decision may be based on a service cache: according to the service-related information collected in the first operational phase, the PCRF 112 may inform the PCEF 110 about particular protocols or services to be analyzed first by the analyzer 116.

In the following, the first operational stage that involves generation or updating of a user profile based on user browsing behaviour tracking will be described with reference to FIGS. 4 to 6.

Figure 4:
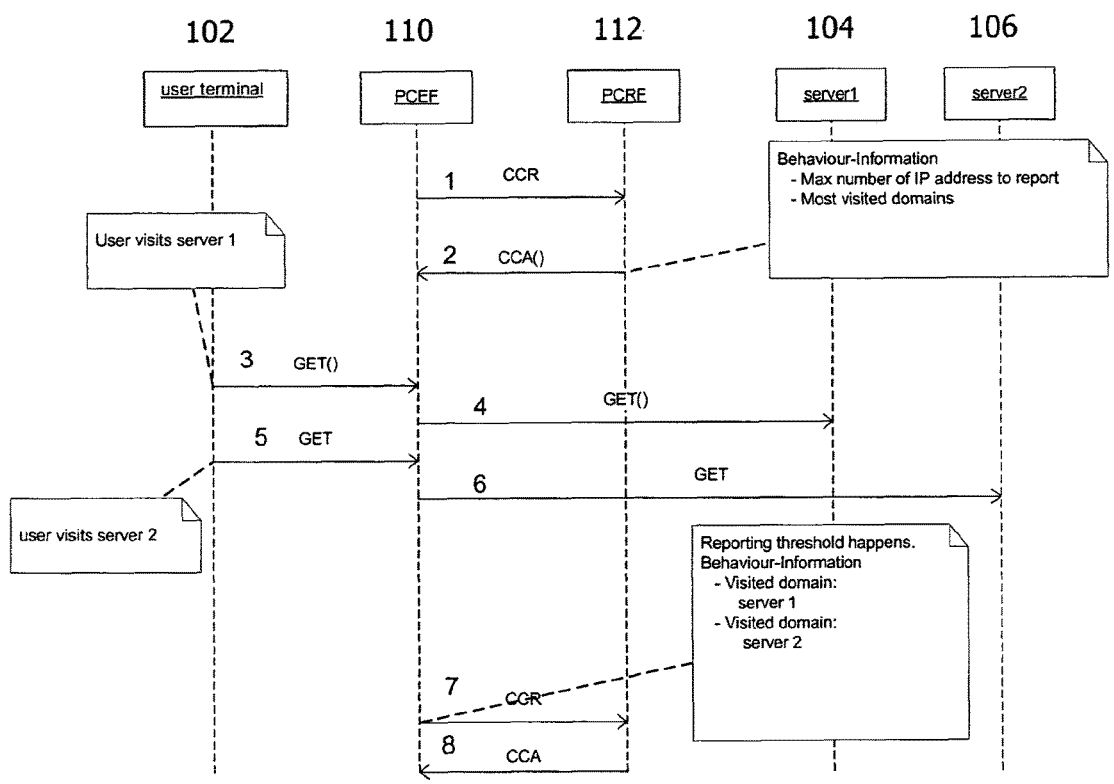
FIGS. 4-10 illustrate various signalling diagrams representative of method embodiments involving the PCEF and PCRF of FIG. 3.

FIG. 4 illustrates a signalling diagram illustrative of a method embodiment for generating or updating a user profile in the user profile database 126 based on a packet flow between the user terminal 102 and two servers 104, 106 operated by respective service providers. It will be assumed that the user terminal 102 is opening a new user session (using, for example, Session Initiation Protocol, or SIP, signalling). In such a case, the PCEF 110 sends in an initial step 1 a Credit Control Request (CCR) command to the PCRF 112. The CCR command opens a control session and includes, inter alia, a session identifier as well a subscription identifier associated with the user terminal 102.

In response to receipt of the CCR command, the PCRF 112 returns in step 2 a Credit Control Answer (CCA) command to the PCEF 110. In a similar manner as a conventional CCA command, the CCR command sent in step 2 may inform the PCEF 110 about policy and charging rules. In addition, the CCA command informs the PCEF 110 about the fact that a user browsing profile is to be generated. This instruction indicates towards the PCEF 110 that the user terminal 102 (and, more particularly, the associated subscription) is to be classified according to the browsing behaviour or according to any other criteria or parameters defined by network operators or service providers. In one implementation, the CCA command sent in step 2 signals the particular user tracking information to be collected by the PCEF 110 and to be reported back to the PCRF 112. This user tracking information may be determined based on the session identifier and/or subscriber identifier received with the CCR command in step 1 or may be predetermined by the PCRF 112. In the specific embodiment illustrated in FIG. 4, the items of information to be collection by the PCEF 110 are the IP addresses visited by the user terminal 102 (up to a maximum number signalled in the CCA command as reporting condition) and the domains (domain names) most often visited.

During the ongoing session, the user terminal 102 sends a Hyper Text Transfer Protocol (HTTP) GET command via the PCEF 110 towards the server 104 (step 3). The PCEF 110, based on DPI, determines the domain (and associated IP address) associated with this GET command and includes the domain (and IP address) in a local list generated for the user terminal 102. Then, the PCEF 110 relays the GET command in step 4 to the server 104. In step 5, the user terminal 102 navigates to another server 106 and transmits a corresponding GET command towards this server 106. The PCEF 110, by DPI analysis, identifies the next domain visit and the domain associated with the server 106. This domain (and associated IP address) is added to the list, and the GET command is relayed by the PCEF 110 in step 6 to the server 106.

Upon detection of a predetermined reporting condition by the PCEF 110 or PCRF 112, the PCEF 110 is triggered to forward the list via another CCR command in step 7 to the PCRF 112. In the present embodiment, the reporting condition could be the fact that the maximum number of IP addresses and/or domains has been collected for the particular session by the PCEF 110. Alternative reporting conditions include termination of the session, expiry of a timer, a specific request received from the PCRF 112, expiry of a predefined data volume, and so on.

The PCRF 112 utilizes the information received in step 7 to generate or update a user profile in the user profile database 126 for the user terminal 102 or the associated subscriber. As an example, the PCRF 112 may update the user profile by associating a user class with the user profile, wherein the user class is selected in accordance with the visited domains and/or IP addresses. Additionally, the PCRF 112 checks whether there is a need for changing the policy and charging rules and/or the items of information to be collected by the PCEF 110. Such a change may, for example, be triggered by the information received in step 7. Then, in an optional step 8, the PCRF 112 sends a new CCA command to the PCEF 110 informing the PCEF 110 about new policy and charging rules and/or about user behaviour tracking modifications.

Figure 5:
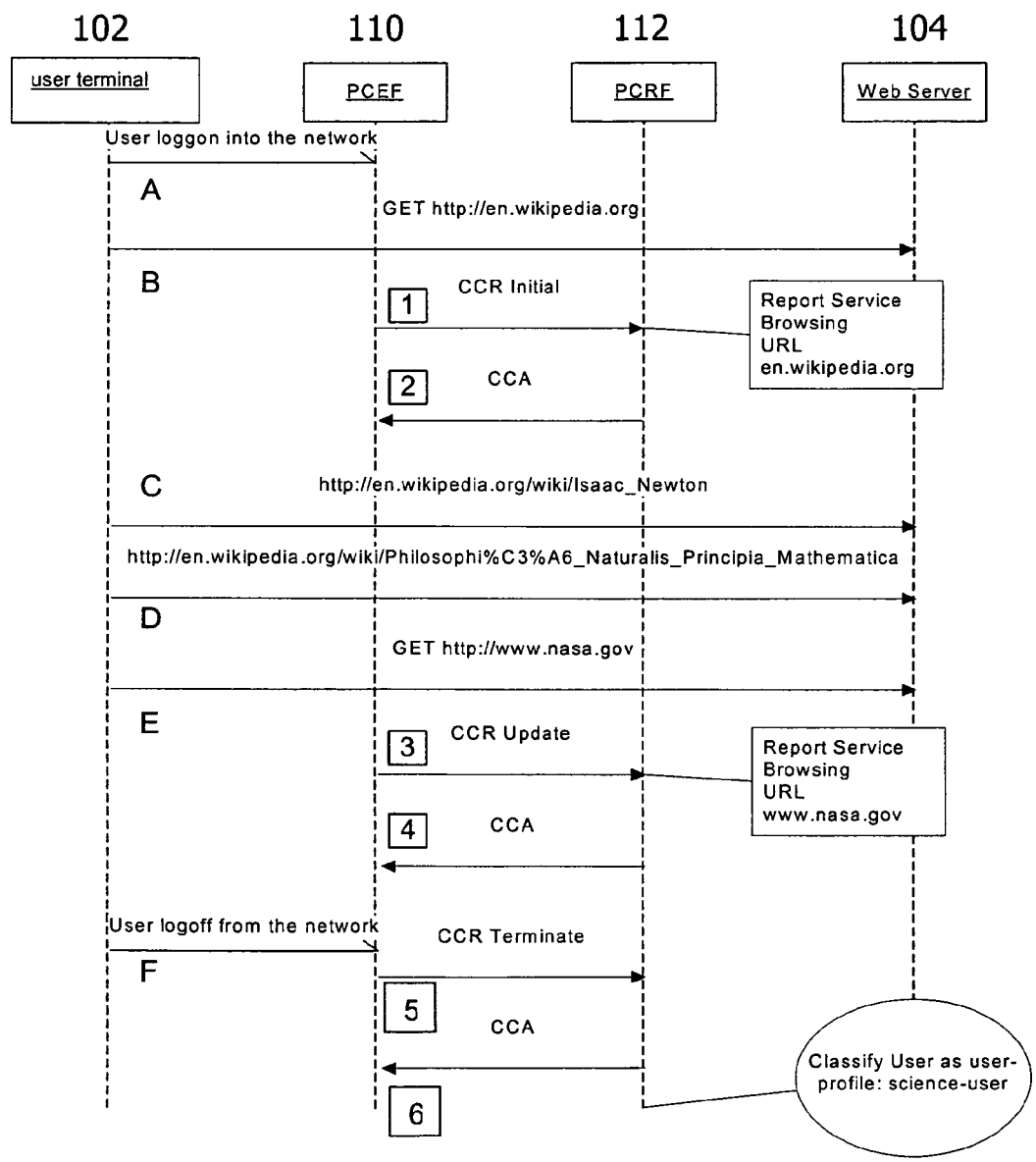

FIG. 5 illustrates another signalling diagram representative of a further method embodiment for generating or updating a user profile in the user profile database 126. In an initial step A, the user terminal 102 is opening a new user session (network log-on) based on SIP signalling towards the PCEF 110. Then, in step B, the user terminal 102 initiates a browsing service by transmitting a GET command to the web server 104.

Responsive to detection of the GET command by DPI, the PCEF 110 opens a control session towards the PCRF 112 indicating, in an initial CCR command, that a browsing service has been initiated by the user terminal 102 (step 1). The initial CCR command sent in step 1 may optionally comprise the URL transmitted with the GET command in step B.

In response to receipt of the CCR command in step 1, the PCRF 112 returns in step 2 optional policy and charging rules with a CCA command to the PCEF 110. The CCA command may additionally (or solely) comprise user profile information indicative of one or more preferred protocols and/or services to be analyzed first by the analyzer 116 of the PCEF 110. This information may be retrieved from a protocol/or service cache associated with the user profile as will be described in more detail below.

In steps C, D and E, the user terminal 102 continues browsing to various URLs. The continued browsing service is reported by the PCEF 110 to the PCRF 112 by a CCR update command in step 3. Additionally, or alternatively, the CCR update command may comprise one or more of the URLs visited by the user terminal 102 since the last report (i.e., since the initial CCR commands in step 1). Upon receipt of the CCR update message in step 3, the PCRF 112 determines whether the user profile has to be updated and whether any of the policy and charging rules and/or user tracking information to be collected need to be changed. Should this be the case, in a subsequent step 4 another CCA command similar to the CCA command sent in step 2 is transmitted to the PCEF 110.

In step F, the user terminal 102 closes the session by sending a network log-off to the PCEF 110. In response to network log-off by the user terminal 102, the PCEF 110 sends a CCR terminate command to the PCRF 112. Upon receipt of the CCR terminate command, the PCRF 112 analyzes the URL information received from the PCEF 110 in steps 1 and 3 and, based on this analysis, allocates a particular user class to the user profile maintained for the user terminal 102 in the user profile database 126. In the present case, the user class "Science User" will be allocated. Other possible user classes may include "VoIP User", "P2P User" and so on.

Figure 6:
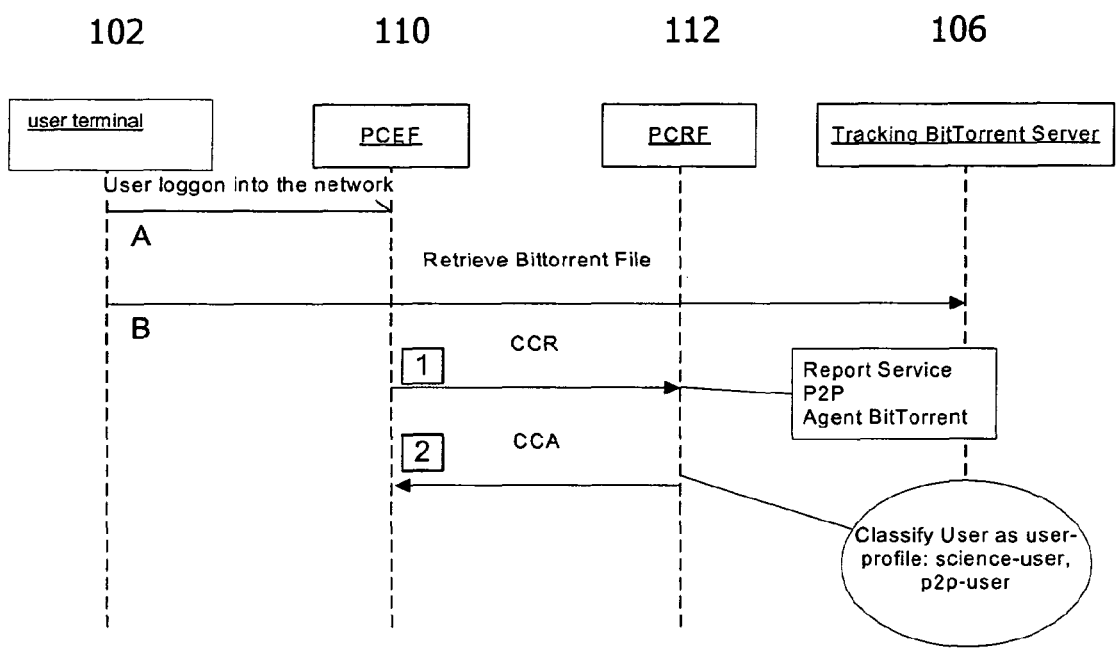

FIG. 6 illustrates a further signalling diagram representative of a method embodiment for generating or updating a user profile in the user profile database 126. Signalling starts by the user terminal 102 opening a session in step A. Then, in step B, the user terminal 102 initiates P2P traffic by downloading a BitTorrent file from BitTorrent server 106.

The PCEF 110 detects the downloading of the BitTorrent file in step B based on DPI and opens a control session towards the PCRF 112. The control session is opened by sending a CCR command to the PCRF 112 indicating that a P2P service has been initiated by the user terminal 102 (step 1). Optionally, the CCR command sent in step 1 may also include the particular P2P protocol in use (e.g., BitTorrent). Responsive to the CCR command received in step 1, the PCRF 112 allocates a further user class ("P2P User") to the user profile associated with the user terminal 102. As has been discussed above with reference to FIG. 5, the user class "Science User" has already been allocated previously to this user profile.

Up to now, the first operational stage that involves generation or updating of a user profile based on user behaviour tracking has been described with reference to FIGS. 4 to 6. Now, the second operational stage will be discussed during which the PCEF 110 performs dataflow handling under control of the PCRF 112.

Figure 7:
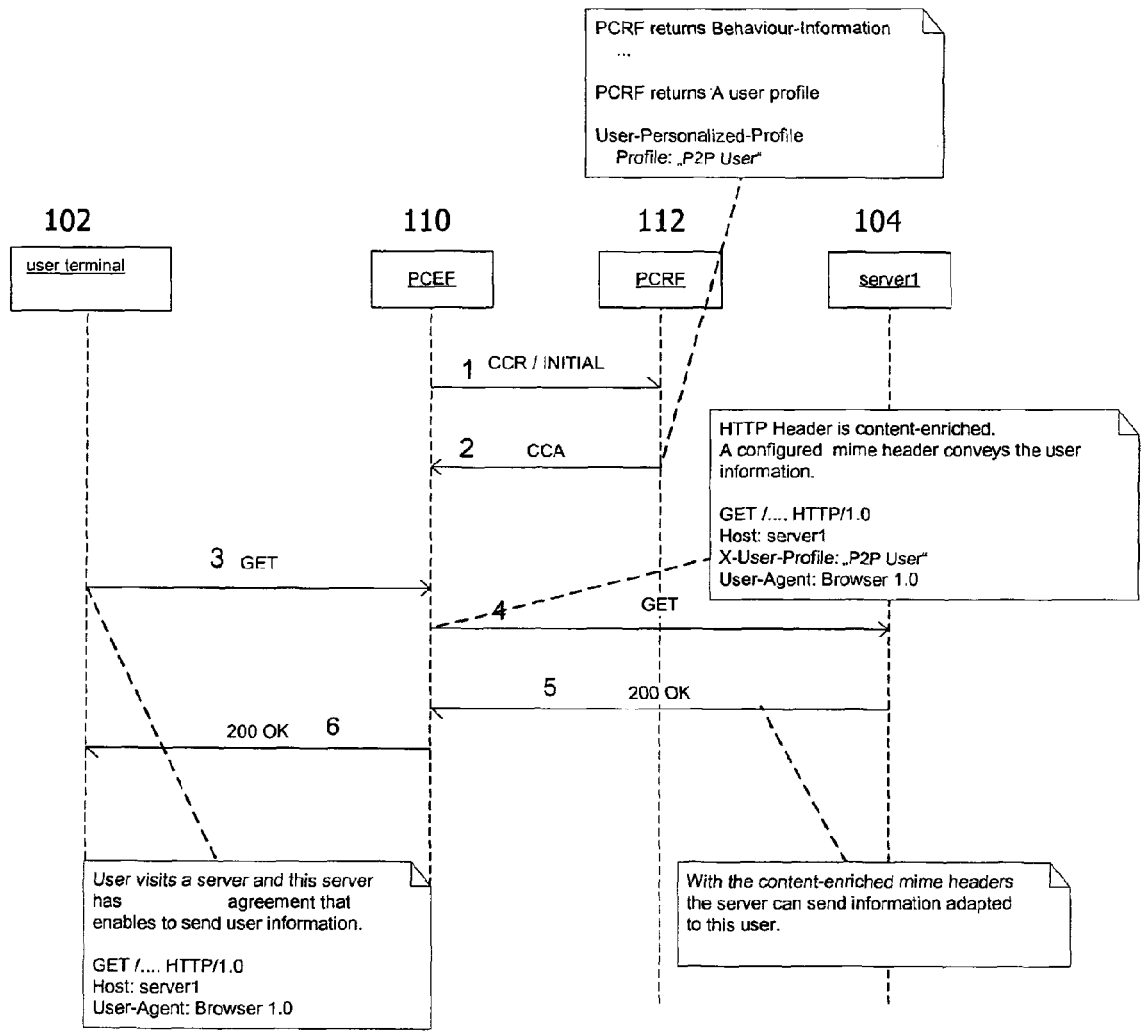

FIG. 7 illustrates a signalling diagram representative of a method embodiment for traffic flow handling by the PCEF 110. The method embodiment of FIG. 7 shows a scenario in which the PCEF 110 and PCRF 112 enrich user requests (GET commands) with user class information derived from the user profile database 126 (and, optionally, from historical reports or subscriber information retrieved from the SPR 114).

In step 1 the PCEF 110 opens a control session towards the PCRF 112 for the user terminal 102 (after network log-on by the user terminal 102). Responsive to receipt of the CCR command in step 1, the PCRF 112 consults the user profile database 126 (e.g., based on a subscriber identifier transmitted together with the CCR command in step 1) and determines the associated user class such as "P2P User". This user class information is then transmitted in step 2 via a CCA command to the PCEF 110.

Then, in step 3, the user terminal 102 wishes to browse to a web page hosted by web server 104. To this end, a GET command is transmitted towards the server 104. Based on DPI, the PCEF 110 detects the GET command and modifies the original GET command by adding extra information indicative of the user class associated with the user terminal 102 (as received via the CCA command in step 2). To this end, a new HTTP parameter called "X-User-Profile" is added to the GET command received in step 3. The modified GET command is relayed in step 4 to the server 104. Here, it is assumed that the service provider operating the server 104 has an agreement with the network service provider operating the PC system including the PCEF 110 and the PCRF 112.

The server 104 analyzes the GET command received in step 4 and extracts the user class information. Based on the extracted user class information, the server 104 may take further steps, including statistical analysis, content enrichment, and so on. In an exemplary content enrichment scenario, the server 104 returns a HTTP response (200 OK) with a content-enriched mime header towards the user terminal 102 in step 5. The content enriching may, for example, relate to information of potential interest to the user operating the user terminal 102. Such information may include marketing information. Content enrichment may be performed in a different manner for different users (or user classes) which permits, for example, personalized marketing. As shown in FIG. 7, the PCEF 110 receives the HTTP response in step 5 and relays same to the user terminal 102 in step 6.

Figure 8:
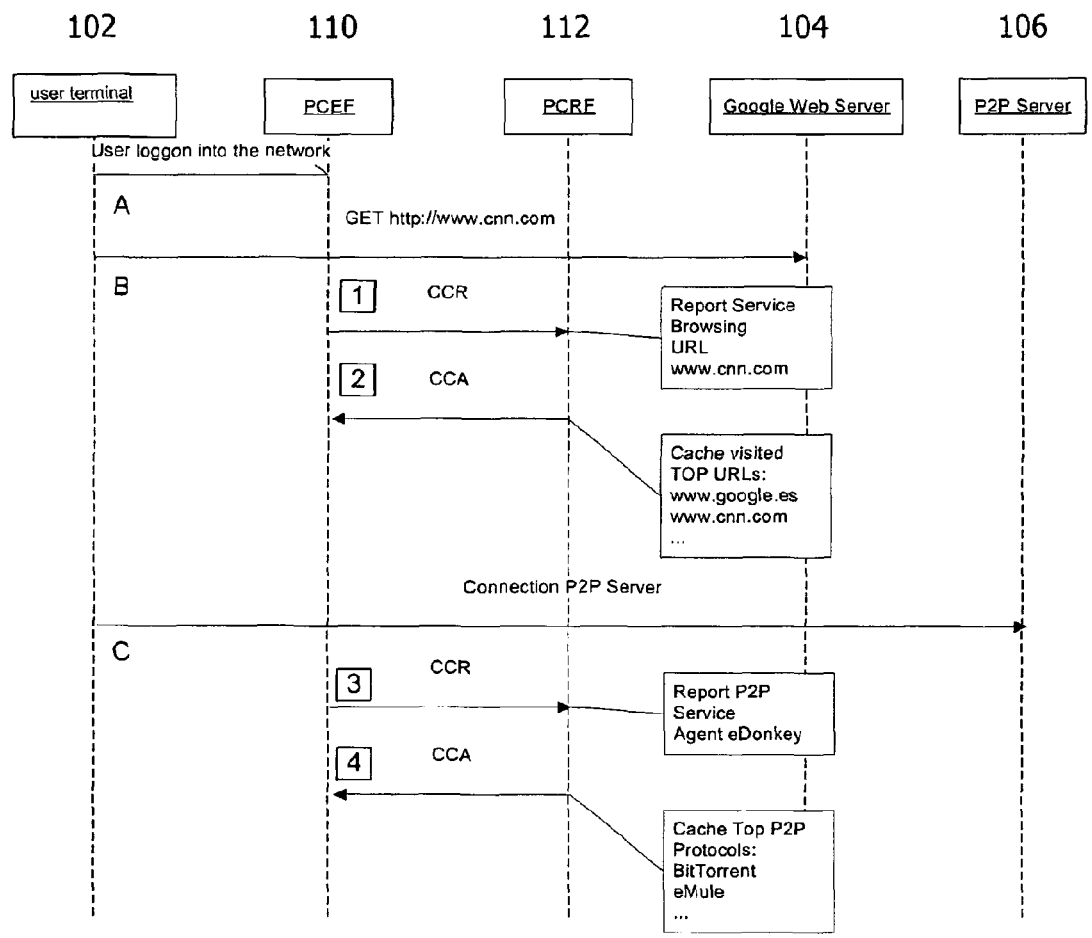

FIG. 8 illustrates a still further signalling diagram representative of a method embodiment of packet flow handling by the PCEF 110.

In initial steps A and B, the user terminal 102 starts a browsing session and connects with web server 104. Then, in step 1, the PCEF 110 opens a control session towards the PCRF 112 indicating, by a CCR command, that a browsing service has been initiated and forwarding the corresponding URL. Based on a subscriber identifier also transmitted with the CCR command in step 1, the PCRF 112 checks the user profile associated with the user terminal 102 in the user profile database 126. The user profile comprises a so-called service cache in which the services (including destination addresses and protocols) most often requested by the user terminal 102 (or the associated subscriber) are stored. In the present case, the PCRF 112 thus determines the URLs most often visited. The corresponding portion of the service cache is returned to the PCEF 110 in step 2 by a CCA command.

The service cache enables the analyzer 116 of the PCEF 110 to start its analysis checking, during the next traffic analysis for the user terminal 102, if the user terminal 102 is requesting any of the services of the service cache (i.e., if the user terminal 102 is browsing by any of the URLs visited most often as transmitted via the CCA command in step 2). Consequently, the analyzer 116 can optimize its analysis tasks based on the service cache. The resulting optimization will improve performance of the PCEF 110.

At a later point in time, the user terminal 102, in step C, connects to the P2P server 106. Again, in step 3, the PCEF 110 detects by DPI that the user terminal 102 is accessing a P2P service and opens a control session towards the PCRF 112. Specifically, the PCEF 110 transmits a CCR command in step 3 to the PCRF 112 to inform the PCRF 112 that a P2P service is being initiated. The PCEF 110 may optionally add the particular P2P protocol (e.g., "eDonkey") to the CCR command sent in step 3.

Upon receipt of the CCR command, the PCRF 112 again consults the user profile database 126 associated with the particular user terminal 102 to determine the cached information collected during the first operational stage. In the scenario illustrated in FIG. 8, the PCRF 112 retrieves from the service cache P2P protocols (or any other traffic or communication protocols) utilized most often by the user terminal 102 in the past. The corresponding portion of the service cache is transmitted in step 4 to the PCEF 110 via a CCA command. During the next traffic analysis for the user terminal 102, the analyzer 116 of the PCEF 110 may thus start analyzing P2P user traffic in accordance with the ordered protocol list received in step 4. This will again improve performance of the PCEF 110.

Figure 9:
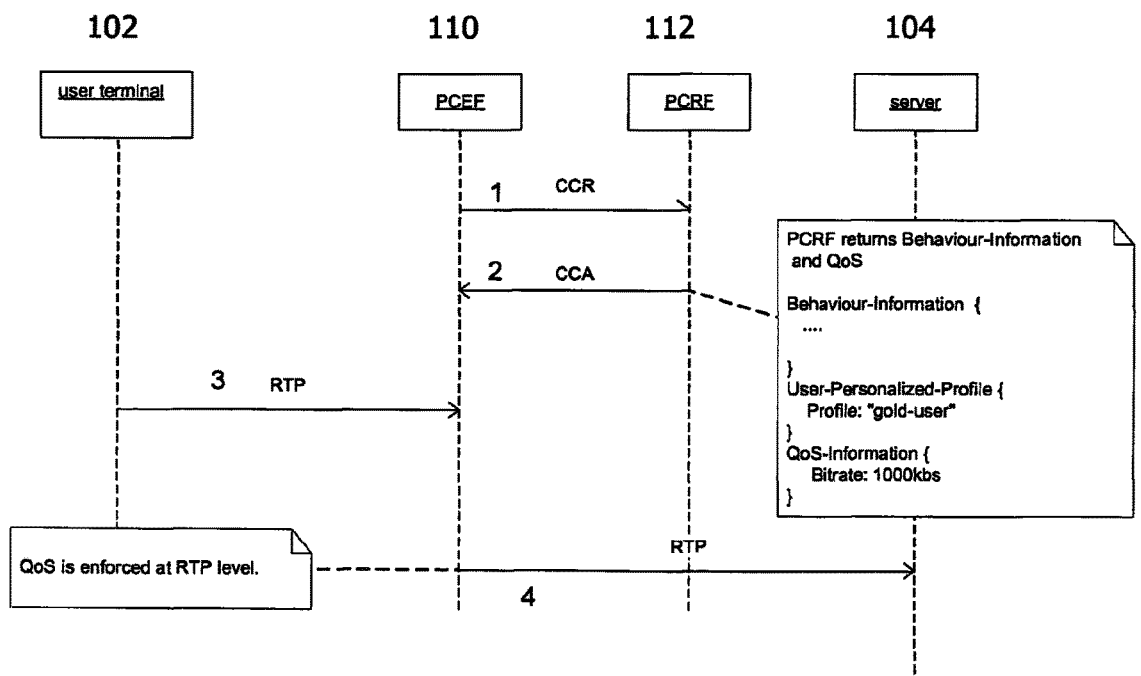

A further signalling diagram illustrative of another method embodiment for traffic flow handling via the PCEF 110 is illustrated in FIG. 9. FIG. 9 illustrates the transfer of user profile information from the PCRF 112 to the PCEF 110 and how a better QoS may be offered to the user terminal 102 for a specific service.

After network log-on by the user terminal 102 the PCEF 110, in step 1, opens a control session towards the PCRF 112 using a dedicated CCR command. The PCRF 112 then searches the user profile database 126 for browsing behaviour information ("browsing profile") and associated QoS information. The corresponding information is returned to the PCEF 110 with a CCA command in step 2.

In step 3, a new Real-time Transport Protocol (RTP) packet flow is started by user terminal 102 via the server 104 to another user (not shown in FIG. 9). The PCEF 110 relays the RTP packet flow, in step 5, to the server 104 enforcing at the RTP level the QoS signalled via the CCA command in step 2. Specifically, the QoS may be applied in accordance with the user browsing profile. As an example, QoS control may dynamically be applied dependent on particular IP addresses, domain names, and so on. Accordingly, a destination address-specific QoS control may be enforced by the PCEF 110 based on the information derived from a user profile and received with the CCA command in step 2 from the PCRF 112.

Figure 10:
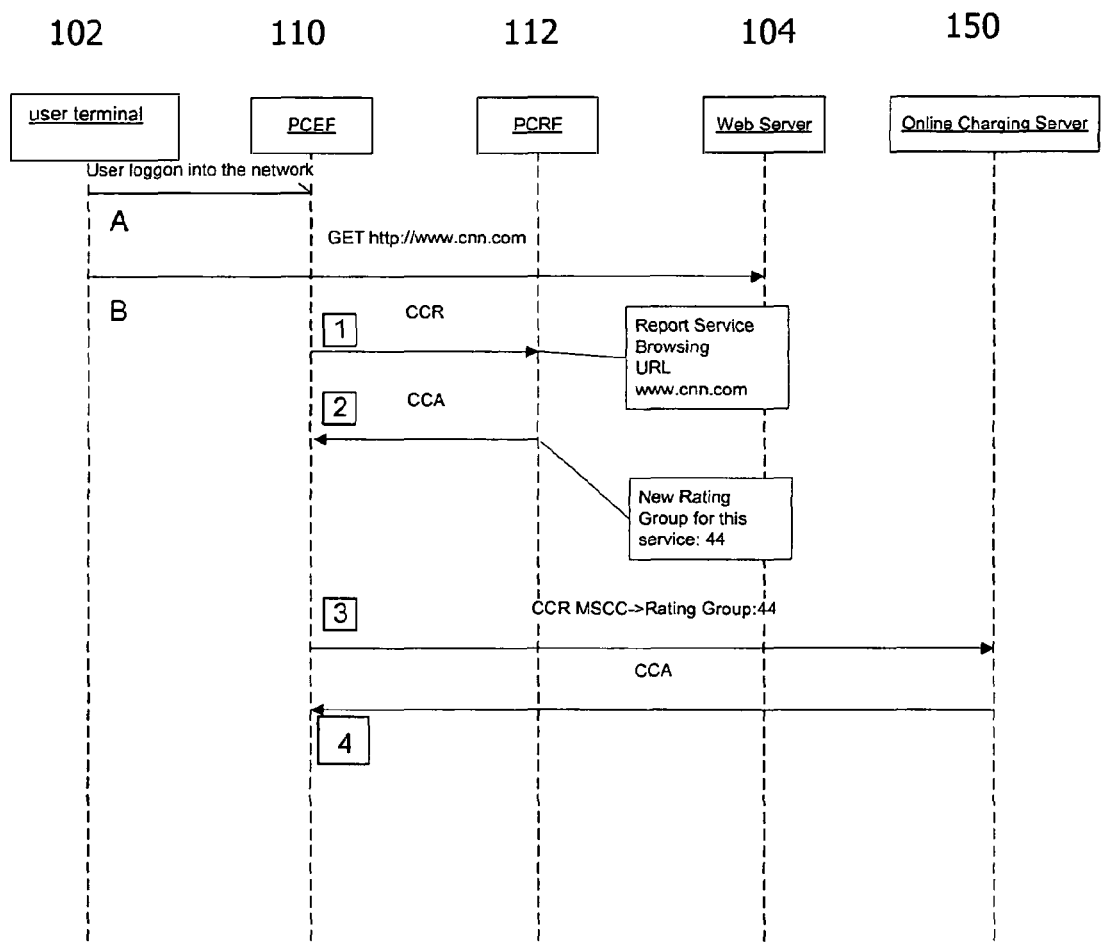

A still further signalling diagram illustrating a method embodiment for traffic flow handling by the PCEF 110 based on user profile information is illustrated in FIG. 10.

The method again starts with the user terminal 102 performing network log-on and initiating a browsing session with web server 104 (steps A and B). The PCEF 110 detects the browsing session based on DPI and transmits a corresponding CCR command to the PCRF 112 in step 1. The PCRF 112 is thus informed about the initiation of a browsing service and the associated URL. Based on the subscriber identifier associated with the user terminal 102 (as, e.g. also transmitted with the CCR command in step 1), the PCRF 112 consults the user profile database 126 to determine an associated charging rate for the particular service. This charging rate is communicated to the PCEF 110 via a CCA command in step 2. Responsive to receipt of the CCA command, the PCEF 110 opens a Gy control session towards an OCS 150 in step 3. The OCS 150 is thus informed about the particular rating group to be applied for the user terminal 102 and the particular service currently provided by the server 104 to the user terminal 102. Receipt of the corresponding CCR command from the PCEF 110 is confirmed by the OCS 150 by returning a CCA command in step 4.

The embodiment illustrated in FIG. 9 permits a dynamic charging. Specifically, the rating group could be changed dynamically according to user behaviour as previously tracked by the PCEF 110. Specifically, charging rates (e.g., a rating group) for a specific destination service may be determined based on a user (browsing) profile.

As has become apparent from the above description of various embodiments, the technique presented herein allows the PCEF 110 to provide user behaviour-related information to the PCRF 112. This information permits enforcement of new policies by the PCRF 112 based on live user traffic. Additionally, performance of the PCEF 110 can take advantage in real-time of service usage information cached at the PCRF 112 regarding, for example, services, service protocols, service addresses, and so on utilized most often by the user terminal 110. As a result, the PCEF 110 can save resources regarding traffic flow detection and traffic classification. Also, traffic classification becomes more accurate because potentially less traffic will need to be classified as "unknown". Still further, by analyzing user behaviour, the communications service provider can more easily discover security problems including fraud, Denial of Service (DoS) attacks, botnets and so on.

The information about user behaviour can also be utilized to discover new navigation tendencies, new web portals and new applications that become increasingly popular. As a result, network resources and mechanisms can be optimized at an early stage to avoid future bottlenecks. Additionally, personalized information, including marketing information, can be distributed more selectively, thus avoiding unnecessary network traffic.

It is believed that many advantages of the technique presented herein will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention be limited only by the scope of the claims that follow.

The invention claimed is:

1. A method, implemented in a Policy Control and Charging Rules Function (PCRF), for updating a user profile based on a packet flow from a user terminal to a destination address in a communications network, the method comprising:
 sending, by the PCRF, a Credit Control Answer (CCA) indicating that a particular service is a user-preferred service to a Policy and Charging Enforcement Function (PCEF), the CCA instructing the PCEF to:
  collect items of information for a particular user session, wherein the items of information comprise Internet Protocol (IP) addresses visited by the user terminal and domains most often visited by the user terminal; and
  transmit, to the PCRF, a report regarding the collected items of information upon collecting a predefined maximum number of items of information;
 receiving, by the PCRF, a Credit Control Request (CCR) comprising the report from the PCEF in response to the CCA;
 updating, by the PCRF, a user profile for a user associated with the user terminal based on the report upon receipt of the CCR.

2. The method of claim 1, wherein the CCA instructing the PCEF to collect items of information comprises the CCA instructing the PCEF to collect items of information that further comprise services utilized by the user terminal, wherein the services comprise at least one of:
 a Domain Name Resolution service;
 a web service;
 a Voice over IP service;
 an IP Multimedia Subsystem service; and
 a Peer-to-Peer service.

3. The method of claim 1, wherein the updating the user profile comprises associating at least one user class with the user profile based on the report.

4. The method of claim 1, further comprising:
 receiving, by the PCRF from the PCEF, a notification regarding an opening of the user session;
 wherein the sending of the CCA instructing the PCEF to collect the items of information and transmit the report is in response to the receiving of the notification.

5. The method of claim 1, further comprising the PCRF transmitting, to the PCEF, the user profile or information derived therefrom or included therein.

6. The method of claim 5, wherein the PCRF transmitting to the PCEF further comprises the PCRF transmitting at least one of:
 a user class indication;
 a preferred destination address indication;
 a Quality of Service indication; and
 a charging indication.

7. The method of claim 5, further comprising:
 receiving, from the PCEF, a notification regarding establishment of at least one of:
  a new user session;
  a new packet flow; and
  a new destination address for the user terminal;
 wherein the PCRF transmitting to the PCEF is in response to the receiving of the notification.

8. A computer program product stored in a non-transitory computer readable medium for updating a user profile based on a packet flow from a user terminal to a destination address in a communications network, the computer program product comprising software instructions which, when run on a computing device serving as a Policy Control and Charging Rules Function (PCRF), causes the computing device to:
 send a Credit Control Answer (CCA) indicating that a particular service is a user-preferred service to a Policy and Charging Enforcement Function (PCEF), the CCA instructing the PCEF to:
  collect items of information for a particular user session, wherein the items of information comprise Internet Protocol (IP) addresses visited by the user terminal and domains most often visited by the user terminal;
  transmit, to the PCRF, a report regarding the collected items of information upon collecting a predefined maximum number of items of information;
 receive a Credit Control Request (CCR) comprising the report from the PCEF in response to the CCA;
 update a user profile for a user associated with the user terminal based on the report upon receipt of the CCR.

9. A Policy Control and Charging Rules Function (PCRF) for updating a user profile based on a packet flow from a user terminal to a destination address in a communications network, the PCRF comprising:
- a physical interface configured to transmit the CCA; and
- processing circuitry configured to:
  - send a Credit Control Answer (CCA) indicating that a particular service is a user-preferred service to a Policy and Charging Enforcement Function (PCEF), the CCA instructing the PCEF to:
    - collect items of information for a particular user session, wherein the items of information comprise Internet Protocol (IP) addresses visited by the user terminal and domains most often visited by the user terminal; and
    - transmit, to the PCRF, a report regarding the collected items of information upon collecting a maximum number of items of information;
  - receive, by the PCRF, a Credit Control Request (CCR) comprising the report from the PCEF in response to the CCA;
  - update a user profile for a user associated with the user terminal based on the report upon receipt of the CCR.

10. A Policy and Charging System for updating a user profile based on a packet flow from a user terminal to a destination address in a communications network, the Policy and Charging System comprising:
- a Policy Control and Charging Rules Function (PCRF) communicatively connected to a Policy and Charging Enforcement Function (PCEF);
- wherein the PCRF comprises processing circuitry configured to:
  - send a Credit Control Answer (CCA) indicating that a particular service is a user-preferred service to the PCEF, the CCA instructing the PCEF to:
    - collect items of information for a particular user session, wherein the items of information comprise Internet Protocol (IP) addresses visited by the user terminal and domains most often visited by the user terminal;
    - transmit, to the PCRF, a report regarding the collected items of information upon collecting a maximum number of items of information;
  - receive a Credit Control Request (CCR) comprising the report from the PCEF in response to the CCA;
  - update a user profile for a user associated with the user terminal based on the report;
- wherein the PCEF comprises:
  - a physical interface configured to receive the CCA from the PCRF;
  - processing circuitry configured to, in response to the receiving the CCA from the PCRF analyze the packet flow, based on the user-preferred service indicated in the CCA, to identify the items of information;
- wherein the physical interface is further configured to transmit the CCR OCR comprising the report to the PCRF in response to the maximum number of items of information having been collected for the particular user session.

* * * * *